(12) United States Patent
Scharfe et al.

(10) Patent No.: US 8,747,541 B2
(45) Date of Patent: Jun. 10, 2014

(54) DISPERSION CONTAINING SILICA PARTICLES SURFACE-MODIFIED WITH QUATERNARY, AMINOFUNCTIONAL ORGANOSILICON COMPOUNDS

(75) Inventors: Stefan Scharfe, Erlensee (DE); Christoph Batz-Sohn, Hanau-Mittelbuchen (DE); Heinz Lach, Rodenbach (DE); Andrea Heuschen, Floersbachtal (DE); Burkhard Standke, Loerrach (DE); Christian Wassmer, Hausen (DE)

(73) Assignee: Evonik Degussa GmbH, Essen (DE)

( * ) Notice: Subject to any disclaimer, the term of this patent is extended or adjusted under 35 U.S.C. 154(b) by 345 days.

(21) Appl. No.: 13/256,557

(22) PCT Filed: Mar. 24, 2010

(86) PCT No.: PCT/EP2010/053797
§ 371 (c)(1),
(2), (4) Date: Sep. 14, 2011

(87) PCT Pub. No.: WO2010/121878
PCT Pub. Date: Oct. 28, 2010

(65) Prior Publication Data
US 2012/0006228 A1   Jan. 12, 2012

(30) Foreign Application Priority Data

Apr. 20, 2009 (DE) .......................... 10 2009 002 499

(51) Int. Cl.
| | | |
|---|---|---|
| C01B 33/18 | (2006.01) | |
| C01B 33/14 | (2006.01) | |
| C09C 1/28 | (2006.01) | |
| C09C 1/30 | (2006.01) | |
| C09C 3/12 | (2006.01) | |
| C09D 7/12 | (2006.01) | |
| B05D 7/24 | (2006.01) | |
| B41M 5/52 | (2006.01) | |

(52) U.S. Cl.
USPC .............. 106/287.11; 106/287.1; 106/287.12; 106/287.14; 106/482; 106/490; 106/491

(58) Field of Classification Search
USPC .............. 106/287.1, 287.11, 287.13, 287.14, 106/482, 490, 491
See application file for complete search history.

(56) References Cited

U.S. PATENT DOCUMENTS

| | | | |
|---|---|---|---|
| 4,902,570 A | 2/1990 | Heinemann et al. | |
| 6,641,870 B2 | 11/2003 | Bartkowiak et al. | |
| 6,663,683 B2 | 12/2003 | Lortz et al. | |
| 6,676,719 B2 | 1/2004 | Lortz et al. | |
| 6,685,766 B2 | 2/2004 | Standke et al. | |
| 6,695,904 B2 | 2/2004 | Burger et al. | |
| 6,767,377 B2 | 7/2004 | Schumacher et al. | |
| 6,767,982 B2 | 7/2004 | Standke et al. | |
| 6,773,697 B2 | 8/2004 | Hemme et al. | |
| 6,773,814 B2 | 8/2004 | Schumacher et al. | |
| 6,808,769 B2 | 10/2004 | Batz-Sohn et al. | |
| 6,841,197 B2 | 1/2005 | Standke et al. | |
| 6,905,632 B2 | 6/2005 | Lortz et al. | |
| 6,991,190 B2 | 1/2006 | Lortz et al. | |
| 7,015,270 B2 | 3/2006 | Scharfe et al. | |
| 7,083,769 B2 | 8/2006 | Moerters et al. | |
| 7,244,302 B2 | 7/2007 | Schumacher et al. | |
| 7,255,735 B2 | 8/2007 | Meyer et al. | |
| 7,374,787 B2 | 5/2008 | Lortz et al. | |
| 7,399,487 B2 | 7/2008 | Batz-Sohn et al. | |
| 7,423,186 B2 | 9/2008 | Standke et al. | |
| 7,470,423 B2 | 12/2008 | Lortz et al. | |
| 7,538,142 B2 | 5/2009 | Lortz et al. | |
| 7,572,854 B2 | 8/2009 | Schneider et al. | |
| 7,615,577 B2 | 11/2009 | Lortz et al. | |
| 7,625,975 B2 | 12/2009 | Barfurth et al. | |
| 7,645,335 B2 | 1/2010 | Lortz et al. | |
| 7,749,322 B2 | 7/2010 | Schumacher et al. | |
| 7,780,777 B2 | 8/2010 | Perlet et al. | |
| 7,781,520 B2 | 8/2010 | Standke et al. | |
| 7,815,936 B2 | 10/2010 | Hasenzahl et al. | |
| 7,834,073 B2 | 11/2010 | Standke et al. | |
| 7,976,719 B2 | 7/2011 | Batz-Sohn et al. | |
| 8,012,367 B2 | 9/2011 | Hasenzahl et al. | |
| 8,039,110 B2 | 10/2011 | Jenkner et al. | |
| 2002/0008011 A1 | 1/2002 | Sonnenschein et al. | |
| 2002/0197311 A1 | 12/2002 | Hasenzahl et al. | |
| 2003/0108580 A1 | 6/2003 | Hasenzahl et al. | |
| 2003/0228271 A1 | 12/2003 | Batz-Sohn et al. | |

(Continued)

FOREIGN PATENT DOCUMENTS

| | | |
|---|---|---|
| CN | 101069133 A | 11/2007 |
| DE | 37 07 226 A1 | 9/1988 |
| DE | 10 2004 057 997 | 6/2006 |
| WO | 2007 019033 | 2/2007 |
| WO | 2008 033988 | 3/2008 |

OTHER PUBLICATIONS

International Search Report issued Jun. 30, 2010 in PCT/EP10/053797 filed Mar. 24, 2010.

(Continued)

*Primary Examiner* — Anthony J Green
(74) *Attorney, Agent, or Firm* — Oblon, Spivak, McClelland, Maier & Neustadt, L.L.P.

(57) ABSTRACT

Dispersion obtainable by reacting a) in 50 to 75 parts by weight of water b) 25 to 50 parts by weight of silica particles having a BET surface area of 30 to 500 m$^2$/g and c) 100 to 300 μg/m$^2$ BET surface area of the silica particles from b) parts by weight of one or more aminofunctional, organosilicon compounds, the aminofunctional, organosilicon compound being a quaternary, aminofunctional, organosilicon compound which is obtainable by reacting at least one haloalkylfunctional silane as component A with a tertiary amine as component B in the presence of a defined amount of water and at least partly removing the resulting hydrolysis alcohol from the system.

21 Claims, No Drawings

(56) References Cited

U.S. PATENT DOCUMENTS

| | | |
|---|---|---|
| 2004/0240062 A1 | 12/2004 | Lortz et al. |
| 2005/0169861 A1 | 8/2005 | Lortz et al. |
| 2005/0265934 A1 | 12/2005 | Schumacher et al. |
| 2006/0104881 A1 | 5/2006 | Lortz et al. |
| 2006/0159635 A1 | 7/2006 | Meyer et al. |
| 2006/0159636 A1 | 7/2006 | Meyer et al. |
| 2006/0159637 A1 | 7/2006 | Meyer et al. |
| 2006/0163533 A1 | 7/2006 | Batz-Sohn et al. |
| 2006/0229210 A1 | 10/2006 | Neugebauer et al. |
| 2006/0292192 A1 | 12/2006 | Hasenzahl et al. |
| 2007/0110906 A1 | 5/2007 | Edelmann et al. |
| 2007/0231280 A1 | 10/2007 | Schumacher et al. |
| 2007/0297998 A1 | 12/2007 | Meyer et al. |
| 2008/0058489 A1 | 3/2008 | Edelmann et al. |
| 2008/0070030 A1 | 3/2008 | Baran et al. |
| 2008/0095724 A1 | 4/2008 | Hasenzahl et al. |
| 2008/0187673 A1 | 8/2008 | Standke et al. |
| 2008/0194855 A1 | 8/2008 | Gottschalk-Gaudig et al. |
| 2008/0206572 A1 | 8/2008 | Edelmann et al. |
| 2008/0213325 A1 | 9/2008 | Schumacher et al. |
| 2008/0221318 A1 | 9/2008 | Edelmann et al. |
| 2008/0249237 A1 | 10/2008 | Hager et al. |
| 2008/0264299 A1 | 10/2008 | Lortz et al. |
| 2009/0005518 A1 | 1/2009 | Just et al. |
| 2009/0007818 A1 | 1/2009 | Militz et al. |
| 2009/0022898 A1 | 1/2009 | Standke et al. |
| 2009/0030162 A1 | 1/2009 | Mueh et al. |
| 2009/0047225 A1 | 2/2009 | Hasenzahl et al. |
| 2009/0069464 A1 | 3/2009 | Standke |
| 2009/0131694 A1 | 5/2009 | Schumacher et al. |
| 2009/0186053 A1 | 7/2009 | Meyer et al. |
| 2009/0261309 A1 | 10/2009 | Lortz et al. |
| 2010/0117021 A1 | 5/2010 | Batz-Sohn et al. |
| 2010/0119851 A1 | 5/2010 | Giessler-Blank et al. |
| 2010/0159144 A1 | 6/2010 | Standke et al. |
| 2010/0191001 A1 | 7/2010 | Wassmer et al. |
| 2010/0209339 A1 | 8/2010 | Schumacher et al. |
| 2010/0209719 A1 | 8/2010 | Borup et al. |
| 2010/0233392 A1 | 9/2010 | Batz-Sohn et al. |
| 2010/0308287 A1 | 12/2010 | Lortz et al. |
| 2011/0143147 A1 | 6/2011 | Edelmann et al. |
| 2011/0144226 A1 | 6/2011 | Spyrou et al. |
| 2011/0259240 A1 | 10/2011 | Jenkner et al. |
| 2011/0268899 A1 | 11/2011 | Albert et al. |

OTHER PUBLICATIONS

Chinese Search Report issued Mar. 15, 2013, in Patent Application No. 201080017595.1 (English-language translation only).
U.S. Appl. No. 13/256,557, filed Sep. 14, 2011, Scharfe, et al.
U.S. Appl. No. 13/642,862, filed Oct. 23, 2012, Scharfe, et al.
U.S. Appl. No. 13/809,255, filed Jan. 9, 2013, Wassmer, et al.
U.S. Appl. No. 13/580,194, filed Aug. 21, 2012, Borup, et al.

DISPERSION CONTAINING SILICA PARTICLES SURFACE-MODIFIED WITH QUATERNARY, AMINOFUNCTIONAL ORGANOSILICON COMPOUNDS

The invention relates to a dispersion containing silica particles surface-modified with quaternary, aminofunctional organosilicon compounds and a coating slip which can be prepared therewith.

It is known that silica-containing aqueous dispersions can be used for the preparation of coating slips for ink-accepting layers in the inkjet sector. For improving the quality, in particular the water resistance and ink density, of the resulting ink-accepting layers, cationic polymers are added to these dispersions in EP-A-1013605, DE-A-10033054 or EP-A-1331254. Particularly in the case of dispersions which have a high filler content and which are particularly desired owing to the better formulatability of the resulting coating slips, the addition of cationic polymers can, however, lead to reduced storage stability of the dispersion.

EP-A-1413451 discloses a process for production of a media sheet for inkjet printing applications, in which porous, inorganic macroparticles and an organosilane reagent are reacted on a substrate. The inorganic macroparticles may be silica particles. The organosilane reagent is an oligomer of the structure

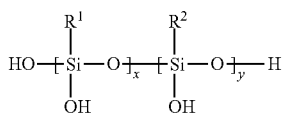

in which x+y=4, $R^1$ and $R^2$ are aminopropyl and the relative molecular mass is 270 to 550. This process is intended to permit improvement of the durability of the printing inks.

In spite of the progress of the prior art, the storage stability and the processability of the dispersions used and the print quality in the inkjet sector remain parameters still in need of improvement.

It was therefore the technical object of the present invention to provide a dispersion which does not have the deficiencies of the prior art. A further object was the provision of an improved coating slip starting from this dispersion.

The invention relates to a dispersion which is obtainable by reacting
a) in 50 to 75, preferably 60 to 70, parts by weight of water
b) 25 to 50, preferably 30 to 40, parts by weight of silica particles having a BET surface area of 30 to 500 m²/g and
c) 100 to 300, preferably 150 to 280, particularly preferably 200 to 250, μg/m² BET surface area of the silica particles from b) parts by weight of one or more aminofunctional, organosilicon compounds, the amino-functional, organosilicon compound being a quaternary, aminofunctional, organosilicon compound which is obtainable by reacting at least one haloalkylfunctional silane as component A with a tertiary amine as component B in the presence of a defined amount of water and at least partly removing the resulting hydrolysis alcohol from the system,
the haloalkylfunctional alkoxysilane
(i) having the general formula I

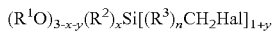 (I), in which
the groups $R^1$ are identical or different and $R^1$ represents a hydrogen, a linear, branched or cyclic alkyl group having 1 to 8 C atoms, an aryl, arylalkyl or acyl group,
the groups $R^2$ are identical or different and $R^2$ represents a linear, branched or cyclic alkyl group having 1 to 8 C atoms, an aryl, arylalkyl or acyl group,
the groups $R^3$ are identical or different and $R^3$ represents a linear, branched or cyclic alkylene group having 1 to 18 C atoms,
n is 0 or 1 and Hal represents chlorine or bromine,
and x is 0, 1 or 2, y is 0, 1 or 2 and (x+y) is 0, 1 or 2, or
(ii) is a hydrolysis product or condensate of at least one alkoxysilane of the abovementioned general formula I or
(iii) is a mixture of at least one alkoxysilane of the abovementioned general formula I and a hydrolysis product and/or condensate of at least one alkoxysilane of the abovementioned general formula I and
the tertiary amine B having the general formula

in which
the groups $R^4$ are identical or different and $R^4$ represents a group $(R^1O)_{3-x-y}(R^2)_xSi[(R^3)_nCH_2—]_{1+y}$, in which $R^1$, $R^2$, $R^3$, n, x, y and (x+y) likewise have the abovementioned meaning, or represents a linear, branched or cyclic alkyl group having 1 to 30 C atoms, which can moreover be substituted, optionally two groups $R^4$ in turn being linked to one another and forming a cycle with the nitrogen of the tertiary amine.

Quaternary, Aminofunctional, Organosilicon Compound

In the process for the preparation of the quaternary, aminofunctional, organosilicon compound, a silane of the formula I, in particular a chloroalkylfunctional silane, optionally the hydrolysis product and/or condensate thereof, is advantageously mixed with a tertiary amine of the formula II. In the presence of 0.5 to 500 mol of water per mole of silicon atoms, quaternization on the nitrogen atom and at least partial hydrolysis and optionally condensation of the compounds of the formulae I and II with the formation of silanol groups take place, followed by a condensation with the formation of Si—O—Si bridges.

Preferably, the reaction can be carried out in the manner of a "one-pot reaction", for example batchwise, it being possible for hydrolysis alcohol to be distilled off during the reaction itself and for further water to be metered in substantially simultaneously. The pressure in the reaction vessel can also be decreased with increasing duration of reaction, i.e. the volatile organic fractions, in particular the hydrolysis alcohol formed, can be removed from the system at least proportionately by distillation under reduced pressure.

Furthermore, at least one further hydrolysable silicon compound, preferably an organoalkoxyfunctional silicon compound, the hydrolysis condensate, homocondensate, cocondensate or block cocondensate thereof or mixtures of these, can be added as a further starting component C to the reaction mixture comprising components A and B.

The process accordingly comprises a quaternization reaction, the hydrolysis and at least partial condensation, including possible homocondensation, cocondensation, block condensation or block cocondensation and is understood chemically to lead to oligomeric and/or polymeric organosilicon compounds having at least one quaternary, alkylammonium-functional radical or to cyclic compounds having quaternary nitrogen, such as, for example, an N-alkylpyrimidinium compound.

The quaternization reaction of compounds of the formula I according to component A and of the tertiary amine of the formula II according to component B to give at least one quaternary, aminoalkylfunctional organosilicon compound is described below in terms of a model, the formulae I and II being defined as above:

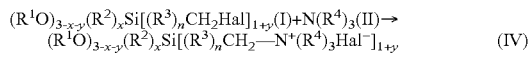

Furthermore, so-called oligomeric and/or polymeric quaternary, aminofunctional, organosilicon compounds can form during the reaction by hydrolysis and condensation of compounds of the formulae I, II and/or resulting quaternization products (IV), as explained below.

Thus, it is assumed on the basis of chemical understanding that, under the reaction conditions according to the invention, the reaction of compounds of the formulae I and II takes place with quaternization and at least partial hydrolysis, as illustrated below in terms of a model. The groups R may represent an alkyl or aminoalkyl group, such as methyl, ethyl, propyl, butyl, N,N-dimethylaminoethyl.

Quaternization and partial or complete hydrolysis:

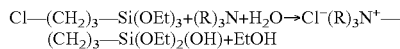

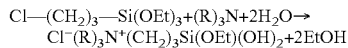

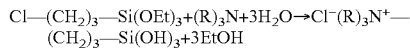

Condensation:

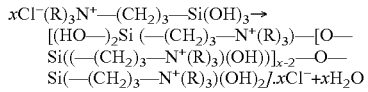

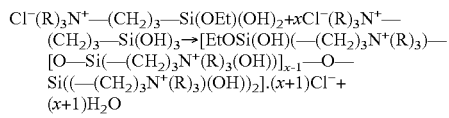

Here, x may be a number from 2 to ∞.

Component A

Examples of haloalkylsilanes of the formula I which can preferably be used are:

3-chloropropyltrimethoxysilane, 3-chloropropyltriethoxysilane, 3-chloropropyltripropoxysilane, chloropropylmethyldimethoxysilane, chloropropylmethyldiethoxysilane, chloro-propyldimethylethoxysilane, chloropropyldimethylmethoxysilane, chloroethyltrimethoxysilane, chloroethyltriethoxy-silane, chloroethylmethyldimethoxysilane, chloroethyl-methyldiethoxysilane, chloroethyldimethylmethoxysilane, chloroethyldimethylethoxysilane, chloromethyltriethoxy-silane, chloromethyltrimethoxysilane, chloromethylmethyl-dimethoxysilane, chloromethylmethyldiethoxysilane, chloro-methyldimethylmethoxysilane, chloromethyldimethylethoxysilane, 2-chloroisopropyltris(methoxyethoxy)silane, 3-chloropropylcyclohexyldiethoxysilane, 3-chloroisobutyltrimethoxysilane, 3-chloroisobutyltriethoxysilane, 3-chloropropylcyclohexyldimethoxysilane, 3-bromoisopropyldiethylcyclohexyloxysilane, 3-chloropropylcyclopentyldienethoxysilane, 3-bromoisobutyltrimethoxysilane, 3-chloroisobutylbis(ethoxyethoxy)methylsilane, 4-bromo-n-butyltriethoxysilane, 4-chloro-n-butyldiethoxycyclopentylsilane, 5-chloro-n-pentyltri-n-butoxysilane, 5-bromo-n-pentyltriethoxysilane, 4-bromo-3-methylbutyldimethoxyphenylsilane, 5-bromo-n-pentyltri-n-butoxysilane, 5-chloro-n-pentyltriethoxysilane, 6-chloro-n-hexylethoxydimethylsilane, 6-bromo-n-hexylpropyldipropoxysilane, 6-chloro-n-hexyldiethoxyethylsilane, 7-chloro-n-heptyltriethoxysilane, 7-chloroheptyldimethoxycycloheptylsilane, 7-bromo-n-heptyldiethoxycyclooctylsilane, 8-chloro-n-octyltriethoxysilane, 8-bromo-n-octyldimethylcyclohexyloxysilane, 3-chloropropyldiethoxyphenylsilane, 3-chloropropylmethoxyethoxybenzylsilane, 3-bromopropyldimethoxybenzylsilane and/or their hydrolysis products and/or homocondensates and/or cocondensates, or expediently 1,4-chlorophenyltrimethoxysilane, 1,4-chlorobenzyltriethoxysilane, chloromethyl-p-methylphenyltrimethoxysilane and/or their hydrolysis products and/or homocondensates and/or cocondensates.

Pure chloroalkyl-substituted alkoxysilanes are particularly preferably used in the process according to the invention.

$R^3$ in formula I is preferably a linear, branched and/or cyclic alkylene having 1 to 18 C atoms, in particular a methylene (—$CH_2$—), ethylene [—$(CH_2)_2$—], propylene [—$(CH_2)_3$—], butylene [—$(CH_2)_4$— or —$(CH_2)CH(CH_3)$ $(CH_2)$—], and n=0 and Hal is chlorine.

The group —$[(R^3)_nCH_2Hal]$ is particularly preferably a chloromethylene, chloroethylene, 3-chloropropylene, 2-chloropropylene, 2-chloroisopropylene, chlorobutylene, chloroisobutylene, chloropentyl, chlorohexyl, chlorocyclohexyl, chloroheptyl, chloro-n-octyl or chlorocyclooctyl group. Expediently, it is also possible to use the corresponding bromine-substituted groups for Hal or a group —$[(R^2)_nCH_2L]$ with L as a leaving group with a sulphonic ester-substituted group (e.g. triflate) or nitric acid or sulphuric ester-substituted groups.

For example, a silicon compound from the series consisting of 3-chloropropyltrimethoxysilane, 3-chloropropyltriethoxysilane, 3-chloropropylmethyldimethoxysilane, 3-chloropropylmethyldiethoxysilane, 3-chloropropyldimethylethoxysilane or 3-chloropropyldimethylmethoxysilane or a hydrolysis product or condensate of the abovementioned alkoxysilanes can advantageously be used as component A.

Component B

In general, all compounds known to the person skilled in the art and containing tertiary amino groups can be used as component B. Those having a boiling point above 85° C. can be preferably used, particularly preferably those having a boiling point above 100° C. or above 120° C.

Suitable tertiary amines, in particular of the formula II, are amines selected from the following group comprising amines of the formulae IIa, IIb and/or IIc and/or IId, for example with IIc or IId as a group B of the silane of the general formula III, and/or compounds derived therefrom.

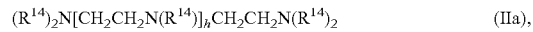 (IIa),

 (IIb),

 (IIc), (IIc*),

 (IId),

 (IId*)

For the tertiary amines of the formula IIa, it is true that $R^{14}$ independently is a straight-chain, branched and/or cyclic alkyl, aryl, in particular benzyl, or alkylaryl having 1 to 20 C atoms, $R^{14}$ preferably being methyl or ethyl, particularly preferably methyl, and h is 0, 1, 2, 3, 4, 5, 6 or 7, in particular h is 0, 1, 2, 3 or 4; preferably, IIa is tetramethylethylenediamine or pentamethyldiethylenetriamine; where $R^{14}$ is methyl ($CH_3$), IIa is $(CH_3)_2N[CH_2CH_2N(CH_3)]_hCH_2CH_2N(CH_3)_2$.

For the tertiary amines of the formula IIb, it is true that w is 2 to 20, in particular w is 8 to 14, and $R^{14}$ has the abovementioned meaning and p* is 1 or 2, such as, in particular, in dioctylmethylamine, di-n-nonylmethylamine, di-n-decylmethylamine, di-n-undecylmethylamine, di-n-dodecylmethylamine, di-n-tridecylmethylamine or di-n-tetradecylmethylamine.

According to a further alternative, an aminoalkylfunctional alkoxysilane having a radical of the formula IIc or the hydrolysis product and/or condensate thereof can be reacted as a tertiary amine of the formula II in the process according to the invention; for example—but not exclusively—a group B of the formula III can correspond to formula IIc or IIc*.

For the tertiary amines of the formula IIc, it is true that $R^{15}$ is a linear, branched and/or cyclic alkylene, arylene or alkylenearyl group having 1 to 20 C atoms, where, in IIc and/or IIc*, 0≤o≤6, and o independently is 0, 1, 2, 3, 4, 5 or 6, in particular $R^{15}$ may be a —$(CH_2)_p$—, as shown in formula IIc*, where 0≤p≤6 and p independently is 0, 1, 2, 3, 4, 5 or 6.

For the tertiary amines of the formula IId, it is true that $R^{14}$ and $R^{15}$ in IId, independently of one another, have the abovementioned meaning and where, in formula IId and/or IId*, 0≤g≤6, 0≤s≤6, i.e. g and/or s independently are 0, 1, 2, 3, 4, 5 or 6 and/or, in formula IId*, $R^{14}$ represents a $CH_3(CH_2)_f$ group and $R^{15}$ represents a —$(CH_2)_i$ group, where 0≤f≤3; 0≤g≤6, 0≤s≤6, 0≤i≤6, i.e. f is 0, 1 or 2; g, s and/or i independently are 0, 1, 2, 3, 4, 5 or 6.

Examples of compounds of tertiary silane-functionalized amines of the general formula II are shown below, the radicals of the compounds being substituted as defined in IIc, IIc* and III:

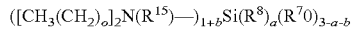

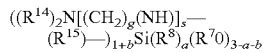

where a is 0, 1 or 2, b is 0, 1 or 2 and (a+b)<3.

Suitable bis(alkoxysilylalkyl)amine compounds are in particular $(OR^{1**})_{b*}R^{2*}_{a*}Si$-A-$SiR^{2*}_{a*}(OR^{1**})_{b*}$, where a*, b*=0, 1, 2 or 3 and a*+b* is 3 per Si atom, where $R^{1**}$ and $R^{2*}$ independently of one another, are alkyl having 1 to 24 C atoms, preferably methyl, ethyl and/or propyl. A represents a bisaminoalkylfunctional group of the formula V, in which $N^{\#}$ in V may correspond to the tertiary nitrogen (N) of the formula V,

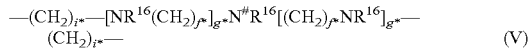

in which $R^{16}$ independently may be a branched, straight-chain and/or cyclic alkyl, aryl or alkylaryl group having 1 to 20 C atoms, $R^{16}$ preferably being methyl or ethyl, particularly preferably methyl, and in which, in formula V, i*, f* or g*, in each case independently of one another, are identical or different, where i* corresponds to 0 to 8, f* corresponds to 1, 2 or 3, g* corresponds to 0, 1 or 2 and $R^{1**}$ corresponds to a linear, cyclic and/or branched alkyl radical having 1 to 4 C atoms, i* corresponding in particular to one of the numbers 1, 2, 3 or 4, preferably 3; $(H_5C_2O)_3Si(CH_2)_3NCH_3(CH_2)_3Si(OC_2H_5)_3$ is particularly preferred.

Suitable tris(alkoxysilylalkyl)amines, in particular of the formula VI, are $$N[ZSi(R^{12})_{\Omega}(OR^{13})_{3-\Omega}]_3 \qquad (VI)$$

in which Z independently is a bivalent alkylene radical, in particular form the series consisting of —$CH_2$—, —$(CH_2)_2$—, —$(CH_2)_3$— or —$[CH_2CH(CH_3)CH_2]$—, $R^{12}$ is a linear, branched and/or cyclic alkyl radical having 1 to 24 C atoms, in particular having 1 to 16 C atoms, preferably having 1 to 8 C atoms, particularly preferably having 1 to 4 C atoms, or an aryl radical, and independently $\Omega$ is 0 or 1, $R^{13}$, in each case independently of one another, is a linear, cyclic and/or branched alkyl radical having 1 to 24 C atoms, in particular having 1 to 16 C atoms, preferably having 1 to 8 C atoms, particularly preferably having 1 to 4 C atoms. Preferably, $R^{13}$ is a methyl, ethyl or propyl radical. Here too, the nitrogen of the formula VIII corresponds to the nitrogen (N) of the general formula V, and $[ZSi(R^{12})_{\Omega}(OR^{13})_{3-\Omega}]$ would correspond to an $R^1$. Tris(tri-ethoxysilylpropyl)amine or tris(trimethoxysilylpropyl)amine is preferably used as the tertiary tris(trialkoxy-silane)amine. In general, compounds of the formula VI, hydrolysis products thereof and/or condensates thereof can be used as the tertiary amine in the process according to the invention.

Preferably, at least one tertiary amine selected from the series consisting of tetramethylethylenediamine, penta-methyldiethylenetriamine, hexadecyldimethylamine, octa-decyldimethylamine, tetradecyldimethylamine, dodecyl-dimethylamine, decyldimethylamine, octyldimethylamine, tetraethylethylenediamine, pentaethyldiethylenetriamine, hexadecyldiethylamine, octadecyldiethylamine, tetradecyldiethylamine, dodecyldiethylamine, decyldiethylamine, octyldiethylamine, isohexadecyldimethylamine, isooctadecyldimethylamine, isotetradecyldimethylamine, isododecyldimethylamine, isodecyldimethylamine, isooctyldimethylamine, isotetraethylethylenediamine, isopentaethyldiethylenetriamine, isohexadecyldiethylamine, isooctadecyldiethylamine, isotetradecyldiethylamine, isododecyldiethylamine, isodecyldiethylamine, isooctyldiethylamine, tris(trimethoxysilylpropyl)amine, tris(triethoxysilylpropyl)amine, tris(trimethoxysilylmethyl)amine and tris(triethoxysilylmethyl)amine can advantageously be used as component B.

Component C

In addition, at least one silicon compound of the formula III functionalized with further organofunctional groups, hydrolysis products thereof, condensates or mixtures of these are suitably used in the process according to the invention as component C, in particular during the reaction, $$(R^7O)_{3-a-b}(R^8)_aSi(B)_{1+b} \qquad (III)$$

in which $R^7$, independently of one another, is hydrogen, a linear, branched and/or cyclic alkyl group having 1 to 8 C atoms, aryl, arylalkyl and/or acyl, particularly preferably alkyl having 1 to 5 C atoms, preferably methyl, ethyl, propyl, and $R^8$, independently of one another, is a linear, branched and/or cyclic alkyl group having 1 to 24 C atoms; in particular having 1 to 16, preferably having 1 to 8, C atoms; aryl, arylalkyl and/or acyl, and B is a second organofunctional group which in each case is identical or different, a is 0, 1 or 2, b is 0, 1 or 2 and a+b is <3.

In particular, the compound of the formula III is selected from compounds where

B is —$[(R^{10})_nR^9]$, in which $R^{10}$ corresponds to a linear, branched and/or cyclic alkylene and/or alkenylene having 1 to 18 C atoms, n is 0 or 1 and $R^9$, independently of one another, corresponds to an unsubstituted or substituted linear, branched and/or cyclic alkyl group having 1 to 30 C atoms, which optionally has one or more —$NR^{3*}_2$, —$OR^{3*}$ and/or —$SR^{3*}$ groups, where $R^{3*}$ is hydrogen and/or $R^{3*}$ is $R^9$ and/or $R^9$, together with a heteroatom N, S or O, is a cycle or heteroaromatic having 1 to 7 C atoms, B is $(R^{5*}O)_{3-x*}(R^{6*})_{x*}Si((R^{2*})CH_2—)$, in which $R^{5*}$, independently of one another, is hydrogen, a linear, branched and/or cyclic alkyl group having 1 to 8 C atoms, aryl, arylalkyl and/or acyl, preferably alkyl having 1 to 5 C atoms, particularly preferably methyl, ethyl, propyl, $R^{6*}$, independently of one another, is a linear, branched and/or cyclic alkyl group having 1 to 24 C atoms, in particular having 1 to 16, preferably having 1 to 8, C atoms, and/or aryl, arylalkyl and/or acyl, $R^{2*}$ is a linear, branched and/or cyclic alkylene and/or alkenylene having 1 to 18 C atoms, preferably an alkylene, and x* is 0, 1 or 2, B is a primary, secondary and/or tertiary aminofunctional radical of the general formulae IIIa or IIIb,

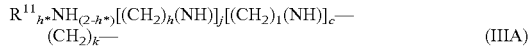

(IIIA)

in which 0≤h≤6; h*=0, 1 or 2, j=0, 1 or 2; 0≤l≤6; c=0, 1 or 2; 0≤k≤6 and $R^{11}$ corresponds to a benzyl, aryl, vinyl or formyl radical and/or a linear, branched and/or cyclic alkyl radical having 1 to 8 C atoms; k is preferably 3, c is preferably 1 or 2, 1 is preferably 1, 2 or 3 and j is preferably 0; particularly preferably, k is 3, c is 1 or 2 and 1 is 2 for a (2-aminoethylene)-3-aminopropyl radical, or j=0; c=2 and k=3, or j=1; c=1 and k=3 with h=2, l=2 for a triaminoethylene-3-propyl radical; and, in formula IIIb

(IIIb)

0≤d≤6 and 0≤p≤6, preferably d is 1 or 2 and p is 3,

B is —(CH₂)ᵢ*—[NH(CH₂)f*]g*NH[(CH₂)f*NH]g*—(CH₂)ᵢ*—SiR²*ₐ*(OR¹**)ᵦ* (IIIc), in which i*, f* or g* in the formula IIIc, in each case independently of one another, are identical or different, where i* corresponds to 0 to 8, f* corresponds to 1, 2 or 3, g* corresponds to 0, 1 or 2 and $R^{1**}$ corresponds to a linear, cyclic and/or branched alkyl radical having 1 to 4 C atoms, where i* is in particular one of the numbers 1, 2, 3 or 4, preferably 3, where a*, b* are 0, 1, 2 or 3 and a*+b* is 3 and $R^{2*}$ is an alkyl radical having 1 to 24 C atoms, B is a radical $R^{12}$—$Y_q$—(CH₂)ₛ—, in which $R^{12}$ corresponds to a mono-, oligo- or perfluorinated alkyl radical having 1 to 20 C atoms or a mono-, oligo- or perfluorinated aryl radical, in which furthermore Y corresponds to a —CH₂—, —O—, -aryl- or —S-radical and q is 0 or 1 and s is 0 or 2, in particular B corresponds to a perfluorinated alkyl radical having 1 to 20 C atoms, B is a vinyl, allyl or isopropenyl radical, mercaptoalkyl radical, sulphanealkyl radical, ureidoalkyl radical, an acryloyloxyalkyl radical, methacryloyloxypropyl radical or a linear, branched or cyclic alkoxy radical having 1 to 24 C atoms, in particular having 1 to 16 C atoms, preferably having 1 to 4 C atoms, in particular a tetraalkoxysilane where a is 0 and b is 0, 1 or 2 in formula III, B is a hydroxyalkyl, epoxy and/or ether radical, in particular a 3-glycidyloxyalkyl, 3-glycidyloxypropyl, dihydroxyalkyl, epoxyalkyl, epoxycycloalkyl or polyalkylglycolalkyl radical or a polyalkylglycol-3-propyl radical, or at least partial hydrolysis products and condensates of one compound or at least two compounds of the formula III.

Preferably, homocondensates, cocondensates or block cocondensates of at least two different compounds of the formula III can be used as oligomeric or polymeric silicon compounds in the process, as are disclosed, for example, in WO 2006/010666.

For example, at least one silicon compound from the series consisting of silicon tetrachloride, tetramethoxysilane, tetraethoxysilane, tetrapropoxysilane, methyltrimethoxysilane, methyltriethoxysilane, ethyltrimethoxysilane, ethyltriethoxysilane, n-propyltrimethoxysilane, n-propyltriethoxysilane, n-butyltrimethoxysilane or isobutyltrimethoxysilane, n-butyltriethoxysilane or isobutyltriethoxysilane, n-octyltrimethoxysilane or isooctyltrimethoxysilane, n-octyltriethoxysilane or isooctyltriethoxysilane, hexadecyltrimethoxysilane, hexadecyltriethoxysilane, vinyltriethoxysilane, vinyltrimethoxysilane, vinyltris(2-methoxyethoxy)silane, phenyltrimethoxysilane, phenyltriethoxysilane, tridecafluoro-1,1,2,2, tetrahydrooctyltrimethoxysilane, tridecafluoro-1,1,2,2, tetrahydrooctyltriethoxysilane, 3-mercaptopropyltrimethoxysilane, 3-mercaptopropyltriethoxysilane, 1-mercaptomethyltrimethoxysilane, 1-mercaptomethyltriethoxysilane, 3-glycidyloxypropyltriethoxysilane, 3-glycidyloxypropyltrimethoxysilane, 3-methacryloyloxyisobutyltrimethoxysilane, 3-methacryloyloxyisobutyltriethoxysilane, 3-methacryloyloxypropyltrimethoxysilane, 3-methacryloyloxypropyltriethoxysilane, 3-methacryloyloxypropylmethyldimethoxysilane, 3-methacryloyloxypropylmethyldiethoxysilane, 3-ureidopropyltriethoxysilane, 3-ureidopropyltrimethoxysilane, 3-aminopropyltrimethoxysilane, 3-aminopropyltriethoxysilane, 3-aminopropylmethyldimethoxysilane, 3-aminopropylmethyldiethoxysilane, 1-aminomethyltrimethoxysilane, 1-aminomethyltriethoxysilane, 2-aminoethyltrimethoxysilane, 2-aminoethyltriethoxysilane, 3-aminoisobutyltrimethoxysilane, 3-aminoisobutyltriethoxysilane, N-n-butyl-3-aminopropyltriethoxysilane, N-n-butyl-3-aminopropylmethyldiethoxysilane, N-n-butyl-3-aminopropyltrimethoxysilane, N-n-butyl-3-aminopropylmethyldimethoxysilane, N-n-butyl-1-aminomethyltriethoxysilane, N-n-butyl-1-aminomethylmethyldimethoxysilane, N-n-butyl-1-aminomethyltrimethoxysilane, N-n-butyl-1-aminomethylmethyltriethoxysilane, benzyl-3-aminopropyltrimethoxysilane, benzyl-3-aminopropyltriethoxysilane, benzyl-2-aminoethyl-3-aminopropyltrimethoxysilane, benzyl-2-aminoethyl-3-aminopropyltriethoxysilane, N-formyl-3-aminopropyltriethoxysilane, N-formyl-3-aminopropyltrimethoxysilane, N-formyl-1-aminomethylmethyldimethoxysilane, N-formyl-1-aminomethylmethyldiethoxysilane, diaminoethylen-3-propyltrimethoxysilane, diaminoethylen-3-propyltriethoxysilane, triaminodiethylen-3-propyltrimethoxysilane, triaminodiethylen-3-propyltriethoxysilane, (2-aminoethylamino)ethyltrimethoxysilane, (2-aminoethylamino)ethyltriethoxysilane, (1-aminoethylamino)methyltrimethoxysilane, (1-aminoethylamino)methyltriethoxysilane, tris(trimethoxysilylpropyl)amine, tris(triethoxysilylpropyl)amine, tris(trimethoxysilylmethyl)amine, tris(triethoxysilylmethyl)amine, bis(trimethoxysilylpropyl)amine, bis(triethoxysilylpropyl)amine, bis(diethoxymethylsilylpropyl)amine, bis(dimethoxymethylsilylpropyl)amine, bis(triethoxysilylmethyl)amine, bis(trimethoxysilylmethyl)amine, bis(diethoxymethylsilylmethyl)amine, bis(dimethoxymethylsilylmethyl)amine, (H₃CO)₃Si(CH₂)₃NH(CH₂)₂NH(CH₂)₃Si(OCH₃)₃, (H₃CO)₃Si(CH₂)₂NH(CH₂)₂NH(CH₂)₃Si(OCH₃)₃, (H₃CO)₂(CH₃)Si(CH₂)₃NH(CH₂)₂NH(CH₂)₃Si(OCH₃)₂(CH₃), (H₃CO)₃(CH₃)Si(CH₂)₃NH(CH₂)₂NH (CH₂)₂NH(CH₂)₃Si(OCH₃)₂ (CH₃), or a mixture of at least two of the abovementioned compounds or a hydrolysis product or condensate of one of the abovementioned compounds or a hydrolysis product, condensate, cocondensate, block condensate or block cocondensate of at least two of the abovementioned compounds can be used as component C.

The following compounds, such as phenyltrimethoxysilane, phenyltriethoxysilane, 3-glycidyloxypropyltriethoxysilane, 3-glycidyloxypropyltrimethoxysilane, tridecafluorooctyl-triethoxysilane, ethyl polysilicate, tetraethyl orthosilicate, tetra-n-propyl orthosilicate, 3-mercaptopropyltrimethoxysilane, 3-mercaptopropyltriethoxysilane, 3-methacryloyloxypropyltrimethoxysilane, 3-methacryloyloxypropyltriethoxysilane, 3-methacryloyloxypropylmethyldimethoxysilane, 3-methacryloyloxypropylmethyldiethoxysilane, 3-ureidopropyltriethoxysilane, 3-ureidopropyltrimethoxysilane, vinyltriethoxysilane, vinyltrimethoxysilane, vinyltris(2-methoxyethoxy)silane, vinylbenzyl-2-aminoethyl-3-aminopropylpolysiloxane, optionally in methanol, and/or the hydrolysis products, homocondensates and/or cocondensates thereof and/or mixtures thereof can also be used in particular as organofunctionalized silicon compounds according to component C.

Particularly preferably, the reaction, according to the invention, of silanes of the formula I in the sense of the component A with tertiary amines of the formula II as component B, optionally in the presence of at least one silicon compound of the formula III as component C of the reaction mixture, is effected in the process according to the invention exclusively in the presence of moisture or water, hydrolysis products, homocondensates and/or cocondensates of II and optionally III also being included and preferably 0.5 mol to 500 mol, particularly preferably 0.5 to 200 mol, of water being used per mole of silicon. For the reaction of the haloalkylfunctional silane, in particular of a chloroalkylsilane, of the formula I, preferably a molar ratio of haloalkyl group to tertiary amine group, in particular of an amine of the formulae II, V and/or VI, of 2:1 to 1:m is established, m being the number of tertiary amine groups; in particular, m is an integer between 1 and 100. Thus, in the process according to the invention it is preferable if the components A and B are used in a ratio whereby the molar ratio of the silicon compound in the sense of the formula I to the tertiary amine compound in the sense of the formula II is 2:1 to 1:m, m representing the number of tertiary amine groups of the formula II and m being an integer between 1 and 100, preferably from 1 to 10, particularly preferably 1, 2, 3, 4, 5, 6 or 7, in particular 1 or 2.

In addition, the components A and C, which are described in more detail below, can advantageously be used in a molar ratio of 1:<4, preferably 1:0 to 2, particularly preferably 1:0.001 to 1, in particular of 1:0.1 to 0.5.

Particularly preferably, the reaction according to the invention of silanes of the formula I in the sense of the component A with tertiary amines of the formula II as component B, optionally in the presence of at least one silicon compound of the formula III as component C of the reaction mixture, is effected in the process according to the invention exclusively in the presence of moisture or water, hydrolysis products, homocondensates and/or cocondensates of II and optionally III also being included and preferably 0.5 mol to 500 mol, particularly preferably 0.5 to 200 mol, of water being used per mole of silicon.

The process for the preparation of the quaternary, aminofunctional, organosilicon compounds can be carried out at a reaction temperature of between 20 and 150° C., in particular between 40 and 120° C., preferably between 60 and 100° C., particularly preferably between 80 and 95° C. The reaction is preferably carried out at atmospheric pressure.

The best results on use in the inkjet sector are obtained if, in the case of the dispersion according to the invention, the quaternary, aminofunctional, organosilicon compound is obtainable by reacting chloropropyltriethoxysilane and tetramethylethylenediamine. Here, silane and tertiary amine are preferably used in equimolar amounts and the resulting hydrolysis alcohol is very substantially separated off.

The invention furthermore relates to a specific dispersion which is obtainable by reacting
a) in 50 to 75, preferably 60 to 70, parts by weight of water
b) 25 to 50, preferably 30 to 40, parts by weight of silica particles having a BET surface area of 30 to 500 m²/g and
c) 100 to 300, preferably 150 to 280, particularly preferably 200 to 250 µg/m² BET surface area of the silica particles from b) parts by weight of one or more quaternary, aminofunctional, organosilicon compounds in the form of an aqueous solution,
the quaternary, aminofunctional, organosilicon compounds being the condensates of the monomers VII and/or VIII,

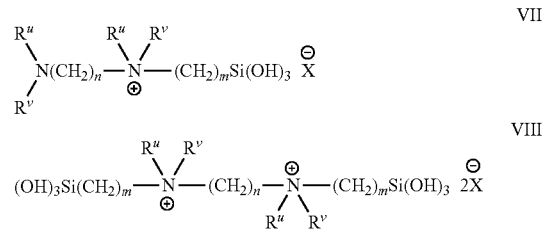

and mixtures of the condensates and of the monomers VII and VIII themselves,
in which
$R^u$ and $R^v$, in each case independently of one another, are an alkyl group having 2 to 4 carbon atoms, m is 2 to 5 and n is 2 to 5.

An embodiment in which u=v=Me, m is 3 and n is 2 is particularly preferred.

The monomers VII and VIII and their condensates are obtainable, for example, by reacting a tertiary diamine $R^uR^vN(CH_2)_nNR^uR^v$, in which m, n, u, v have the abovementioned meaning, with a chloroalkoxysilane $Cl(CH_2)_mSi(OEt)_3$ in the presence of water.

According to $^{29}Si$-NMR spectroscopy, the quaternary, amino-functional, organosilicon compounds have 10 to 20% of M-structures, 40 to 60% of D-structures and 25 to 35% of T-structures, in addition to 1 to 5% of the monomeric structures.

An embodiment in which the condensates are present in an amount of 75 to 95%, particularly preferably 80 to 90%, in the form of the structure VII and in an amount of 5 to 25%, particularly preferably 10 to 20%, in the form of the structure VIII is preferred.

The proportion of quaternary, aminofunctional, organosilicon compounds in the aqueous solution is preferably 30 to 60% by weight and particularly preferably 40 to 50% by weight.

Silica Particles

The silica particles on which the dispersion according to the invention is based are amorphous silica particles. Furthermore, the silica particles have condensable groups, for example OH groups, on their surface. Mixed oxides with silica as a constituent or silica-coated metal oxide particles are also to be included.

The amorphous silica particles can be prepared, for example, by electric arc processes, plasma processes, wet chemical processes, such as precipitation and gelling processes, and by pyrogenic processes.

The silica particles are preferably pyrogenically prepared particles.

Pyrogenic is to be understood as meaning the hydrolysis or oxidation of silicon compounds in the gas phase in a flame, produced as a rule by the reaction of hydrogen and oxygen. First, finely divided, nonporous primary particles are formed, which can unite to form aggregates in the further course of the reaction and these can further combine into agglomerates.

The BET surface area of the silica particles used can vary over a wide range, from 30 to 500 m$^2$/g. However, it was found that the use of pyrogenically prepared silica particles having a BET surface area of 200 m$^2$/g or more, in particular those having a BET surface area of 240 to 330 m$^2$/g, leads to dispersions which have particularly good properties in the inkjet sector.

Further Constituents of the Dispersion

The dispersion according to the invention may additionally contain one or more basic substances. As a rule, these may be amines and/or salts thereof. In particular, said substance may be a tertiary amine, for example one having the structure $R_uR_vN$—$(CH_2)_n$—$NR_uR_v$. The proportion of tertiary amine having the structure $R_uR_vN$—$(CH_2)_n$—$NR_uR_v$ may be up to 15 mol % per 100 SiCH$_2$ groups.

Acids may be used for further improving the stability of the dispersion according to the invention. Suitable acids may be hydrochloric acid, C1-C4-carboxylic acids, C1-C4-hydroxycarboxylic acids or C1-C4-dicarboxylic acids. It was found that the best results are obtained with formic acid. The reason for this is not known. Usually, the acid is added in an amount such that a pH of the dispersion of 2 to 6, preferably 3 to 5, particularly preferably 3.5 to 4.5, results.

However, it should be mentioned that stable dispersions can be obtained even without addition of acid.

The dispersion according to the invention may furthermore contain organic solvents, bactericides and/or fungicides.

Preparation of the Dispersion

The preparation of the dispersion according to the invention is effected as a rule in two steps. First, a predispersion is prepared in a first step, in which silica particles are added to the liquid components of the dispersion with little energy input, for example by means of a dissolver. The actual dispersing is then effected in a second step, in which the energy input is higher than in the first step. Suitable dispersing units are known to a person skilled in the art. A rotor-stator aggregate may be mentioned by way of example.

Coating Slip

The invention furthermore relates to a coating slip which contains the dispersion according to the invention and at least one binder.

For example, the following may be used as binders: polyvinyl alcohol, partly or completely hydrolysed, and cationized polyvinyl alcohol having a primary, secondary or tertiary amino group or a tertiary ammonium group on the main chain or on the side chain. Further combinations of these polyvinyl alcohols with one another and polyvinylpyrrolidones, polyvinyl acetates, silanized polyvinyl alcohols, styrene-acrylate latices, styrene-butadiene latices, melamine resins, ethylene-vinyl acetate copolymers, polyurethane resins, synthetic resins, such as polymethyl methacrylates, polyester resins (e.g. unsaturated polyester resins), polyacrylates, modified starch, casein, gelatin and/or cellulose derivatives (e.g. carboxymethylcellulose).

Polyvinyl alcohol or cationized polyvinyl alcohol can preferably be used.

Furthermore, the coating slip may also contain one or more other pigments, such as calcium carbonates, phyllosilicates, aluminium silicates, plastic pigments (e.g. polystyrene, polyethylene, polypropylene), silica gels, aluminium compounds (e.g. aluminium sols, colloidal aluminas and the hydroxy compounds thereof, such as pseudoboehmites, boehmites, aluminium hydroxide), magnesium oxide, zinc oxide, zirconium oxide, magnesium carbonates, kaolin, clay, talc, calcium sulphate, zinc carbonate, satin white, lithopone, and zeolites.

The coating slip may have a content of mixed oxide particles of between 10 and 60% by weight. Preferably, it may be greater than 15% by weight, particularly preferably it may be greater than 25% by weight.

Crosslinking agents, such as zirconium oxides, boric acid, melamine resins, glyoxal and isocyanates and other molecules which link the molecular chains of the binder system to one another may serve for increasing the water resistance of the binder system and hence of the coating.

Furthermore, auxiliaries, such as optical brighteners, antifoams, wetting agents, pH buffers, UV absorbers and viscosity auxiliaries, may be used.

The coating slip according to the invention preferably has a solids content of 10 to 30% by weight and particularly preferably one of 15 to 30% by weight.

The invention furthermore relates to the use of the dispersion and coating slip according to the invention for coating ink-accepting inkjet media.

EXAMPLES

Methods of Determination

Hydrolysable chloride is titrated potentiographically with silver nitrate (for example Metrohm, type 682 silver rod as indicator electrode and Ag/AgCl reference electrode or other suitable reference electrode). Total chloride content according to the Wurzschmitt digestion. For this purpose, the sample is digested with sodium peroxide in a Wurzschmitt bomb. After acidification with nitric acid, chloride is measured potentiographically with silver nitrate.

In a complete reaction of the chloroalkyl function with tertiary amines, the analytical values for hydrolysable chloride and total chloride are identical and therefore a measure for the completeness of the reaction since the sum of salt-like chloride (amine hydrochloride) and covalently bonded chlorine (chloroalkyl function) is determined by total chloride and exclusively salt-like chloride or chloride which can be eliminated with water (existing amine hydrochloride) is determined by hydrolysable chloride. At the beginning of the reaction, the value for hydrolysable chloride is zero and increases at complete conversion to the value which is measured for total chloride.

The alcohol content after hydrolysis is determined by gas chromatography. For this purpose, a sample of a defined amount is hydrolysed with sulphuric acid (5 g of sample, 25 ml of H$_2$SO$_4$, w=20%). 75 ml of distilled water are added. Thereafter, neutralization is effected with sodium hydroxide solution and a steam distillation is carried out. Internal standard 2-butanol. Organically bonded nitrogen can be converted into ammonium by means of a Kjeldahl digestion and, after addition of sodium hydroxide solution, can be determined acidimetrically as ammonia (cf. also DIN 1310, DIN 32625, DIN 32630, DIN EN 25663-H11, DIN 38409-H12, AN-GAA 0629-Büchi 322/343). The determination of SiO$_2$ is effected after decomposition by means of sulphuric acid and a Kjeldahl catalyst by determining the weight of precipitated $SiO_2$.

The viscosity is determined as a rule according to DIN 53015.

The determination of the solids content, i.e. of the non-volatile fractions in aqueous and solvent-containing preparations, is effected according to DIN/EN ISO 3251 (determination of the non-volatile fraction of coatings, paints and binders for coatings and paints) and is carried out as follows (QM-AA):

A sample is heated to a specified temperature (e.g. 125° C.) in order to remove the volatile fractions of the sample in this way. The solids content (dry residue) of the sample is determined after the heat treatment. About 1 g of sample is weighed (accuracy 1 mg) into a disposable dish on an analytical balance. The product should be distributed uniformly in the disposable dish by brief swirling. The dish is stored for 1 h at about 125° C. in a drying oven. After the end of the drying process, the dish is cooled to room temperature for 20 min in a desiccator and reweighed on the analytical balance to an accuracy of 1 mg. At least two determinations are carried out per experiment.

Solids content (%)=final weight (g)× 100/weight taken (g)

Final weight: sample mass after the treatment.

Weight taken: sample mass before the treatment.

Example 1

Preparation of the Quaternary, Aminofunctional, Organosilicon Compound 1547.2 g of N,N,N',N'-tetramethylethylenediamine (TMEDA) are rapidly added to 3206.2 g of chloropropyltriethoxysilane with stirring. A first addition of water (1603.1 g) is then effected within about 20 minutes (volume flow rate about 4.8 l/h) with vigorous stirring. The bottom product is now substantially cloudy and heating under reflux (about 87° C.) is effected for 6 h. A second addition of water (641.3 g) to the now clarified bottom product is effected within 10 minutes (volume flow rate about 3.9 l/h). After heating under reflux for a further 1.5 h, a third addition (1600.0 g) of water is effected with stirring (within 20 minutes, volume flow rate about 4.8 l/h).

At a bottom temperature of 49° C. to 54° C., hydrolysis ethanol is distilled off in vacuo (100-270 mbar). After about 1700 g of an ethanol/water mixture have been distilled off, 327 g of water are rapidly metered in. In order to distill off the hydrolysis alcohol virtually completely, an at least 60% excess (based on the mass of hydrolysis ethanol) is distilled off. The amount of water distilled off is added again at the end of the distillation.

The yellowish slightly cloudy product is then filtered by means of a pressure filter (21) and Seitz 500 deep-bed filter at 0.8 bar gauge pressure (filtration rate at $d_{filter}$=14 cm:18 l/h).

6521.4 g of a clear, slightly yellowish solution are obtained.

The physicochemical values of the solution are reproduced in Table 1.

TABLE 1

Physicochemical values of the solution from Example 1

| Determination | | Result | Method |
|---|---|---|---|
| Solid | % by wt. | 48.4 | DIN 38409-H1-1 |
| pH | | 8.6 | 1:1 in water, DIN 38404-C5 |
| $SiO_2$ | % by wt. | 11.8 | see above |
| Ethanol after hydrolysis | % by wt. | 0.5 | see above |
| Total nitrogen | % by wt. | 5.0 | see above |
| Total chloride | % by wt. | 7.2 | see above |
| Hydrolysis chloride | % by wt. | 7.1 | see above |
| Viscosity (20° C.) | mPas | 70 | DIN 53015 |
| Density (20° C.) | g/ml | 1.107 | DIN 51757 |
| Refractive index (20° C.) | | 1.4224 | DIN 51423 |
| Colour | mg Pt-Co/l | 75 | |

According to $^{13}$C-NMR, about 85% of TMEDA groups are present as monoadduct of the structure IIIa and about 15% as bisadduct IVa. 8 mol % of free TMEDA are present per 100 $SiCH_2$ groups.

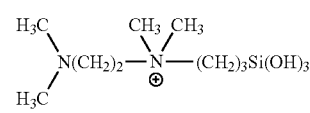

IIIa

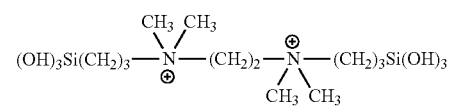

IVa

According to $^{29}$Si-NMR, 2.5 Si-% of monomeric structures, 14.6 Si-% of M-structures, 49.7 Si-% of D-structures and 33.3 Si-% of T structures are present.

Example 2

Preparation of an Aqueous Hydrolysate Starting from N-butylaminopropyltrimethoxysilane (Dynasylan® 1189)

181.15 g of demineralized water and 68.10 g of formic acid are initially introduced with stirring and 249.53 g of N-butylaminopropyltrimethoxysilane are added dropwise so that the bottom temperature does not exceed 60° C. After the end of the addition, the pH is between 4.0 and 5.0. Stirring is then effected at a bottom temperature of 60° C. Before the methanol is distilled off, 101.9 g of water are added so that the methanol distilled off is replaced in terms of volume. At a pressure of 130 mbar and a bottom temperature of 40 to 60° C., 203.8 g of methanol/water are distilled off. The bottom product is then weighed and is made up again to the original mass of 499.0 g with demineralized water.

The physicochemical values of the solution are reproduced in Table 2.

TABLE 2

Physicochemical values of the solution from Example 2

| Determination | | Result | Method |
|---|---|---|---|
| Solid | % by wt. | 44.0 | cf. QM-AA |
| pH | | 4.6 | DIN 38404 |

TABLE 2-continued

Physicochemical values of the solution from Example 2

| Determination | | Result | Method |
|---|---|---|---|
| $SiO_2$ | % by wt. | 12.7 | see above |
| Methanol after hydrolysis | % by wt. | 0.6 | see above |
| Total nitrogen | % by wt. | 2.8 | see above |
| Viscosity (20° C.) | mPas | 27.9 | DIN 53015 |
| Density (20° C.) | g/ml | 1.012 | DIN 51757 |

According to $^1$H-NMR, 1.2 mol of formate and 0.05 mol of methanol are present per N-butylaminosilyl radical.

According to $^{29}$Si-NMR, 1% of monomers, 5 Si-% of M-structures, 37 Si-% of D-structures and 57 Si-% of T structures are present.

Preparation of Dispersions

Example D1

Dispersion starting from AEROSIL® 300 Silica and N-butylaminopropyltrimethoxysilane (Dynasylan® 1189) (Comparative Example)

530 g of AEROSIL® 300 are stirred into 1100 g of demineralized water by means of a dissolver at 1500 to 4000 rpm and then subjected to further preliminary dispersion over a period of five minutes at 2000 rpm. Dispersing is then effected for ten minutes using a rotor-stator dispersing device at 15,000 rpm with cooling (<30° C.)

Stirring is then effected again at 2000 rpm with the dissolver and a mixture of 33 g of Dynasylan® 1189, 67 g of methanol and 20 g of formic acid (50% strength solution in water) is added, after which final dispersing is effected at 60° C. for 60 minutes in the rotor-stator system at 5000 rpm.

Finally, the dispersion is cooled and is filtered over a 500 µm sieve.

Example D2

Dispersion starting from AEROSIL® 300 Silica and Dynasylan® 1189—Higher Proportion of Dynasylan® (Comparative Example)

Analogous to Example D1, but with a higher proportion of silane.

40 g of Dynasylan® 1189 (dissolved in 60 g of methanol) are used.

Example D3

Dispersion starting from AEROSIL® 300 Silica and Solution from Example 2 (Comparative Example)

Analogous to D1, except that 82.5 g of the solution from Example 2 are used. 10 g of formic acid (50% strength solution in water) are used.

Example D4

Dispersion starting from AEROSIL® 300 Silica and Octadecyldimethyl(3-trimethoxysilylpropyl)Ammonium Chloride (Comparative Example)

Preparation analogous to D1, but with octadecyldimethyl-(3-trimethoxysilylpropyl)ammonium chloride.

Even at small solids contents of 5 to 10% by weight, the dispersions are unstable and flocculate during the preparation of the dispersion. It is not possible to prepare dispersions having a higher filler content.

Example D5

Dispersion According to the Invention, starting from AEROSIL® 300 Silica and the Solution from Example 1—with Addition of Acid 530 g of AEROSIL® 300 are stirred into a mixture of 1100 g of demineralized water, 71.5 g of the solution from Example 1 and 20 g of formic acid (50% strength by weight solution in water) using a dissolver at 1500 to 5000 rpm and dispersing is effected for a further 5 minutes at 2000 rpm. Dispersing is then effected with a rotor-stator dispersing device (Kinematica Polytron PT6100) over a period of 10 minutes at 15,000 rpm. Further dispersing is then effected at 60° C. for 60 minutes with the rotor-stator system at 5000 rpm.

Finally, the dispersion is cooled and is filtered over a 500 µm sieve.

Example D6

Dispersion According to the Invention, starting from AEROSIL® 300 Silica and the Solution from Example 1—no Addition of Acid Analogous to D5, but without the use of acid.

TABLE 3

Physicochemical data of the dispersions D1 to D6

| | | Comparison | | | according to the invention | |
|---|---|---|---|---|---|---|
| | | D1 | D2 | D3 | D5 | D6 |
| pH | | 3.7 | 3.5 | 3.2 | 3.8 | 5.1 |
| Solids content*) | % by wt. | 32.6 | 32.9 | 31.0 | 32.4 | 32.0 |
| Viscosity**) | mPa·s | 153 | 83 | 106 | 108 | 140 |
| Storage stability***) | Months | <3 | <3 | <3 | >6 | >3 |

*)after drying to constant weight at 125° C.;
**)at 1000 l/s; 23° C.;
***)at room temperature (23° C.)

It is found that the dispersion D5 according to the invention is more stable than the dispersions of comparative examples D1 to D3.

Even without the use of acid, it is possible to obtain a dispersion (D6) whose storage stability is better than that from comparative example D1.

The stabilizing effect in the absence of acid is surprising. The person skilled in the art has to date assumed that stabilization of a silica-containing dispersion by means of aminosilanes is not possible without addition of acid.

In the preparation of the dispersions according to the invention, it is possible to initially introduce the liquid components—water, the solution 1 and optionally water—together and then to disperse the AEROSIL® 300 therein. Such a procedure, for example with the use of Dynasylan® 1189 (Example D1), is possible only to a limited extent since the viscosity on incorporation of AEROSIL® 300 increases very greatly so that only solids contents of less than 30% by weight can be achieved.

Preparation of Coating Slips

Example S1 (Comparative Example)

A 12% strength by weight solution of polyvinyl alcohol PVA 235, from Kuraray Europe, is added to the dispersion D1 in each case by means of a dissolver at 500 rpm and stirred for 10 minutes. PVA 235 is added in an amount such that a solids content (silica+PVA) of 22.5% by weight results, the ratio of silica to PVA being 5:1.

Thereafter, a 7% strength by weight solution of boric acid in water is added. The amount of boric acid is 12.5% by weight of the amount of the polyvinyl alcohol. Finally, the glyoxal-containing composition "Cartabond TSI" from Clariant is added. The amount corresponds to 4.8% by weight of the amount of the polyvinyl alcohol.

The viscosity of the inkjet coating slip is measured after 24 h by means of a Brookfield viscometer.

Examples S2, S3, S5 and S6 are prepared analogously to S1, but with the use of the respective dispersion D2, D3, D5 and D6. The solids contents and viscosities of the coating slips are reproduced in Table 4.

TABLE 4

Solids contents and viscosities of the coating slips

|  |  | Comparative example | | | according to the invention | |
|---|---|---|---|---|---|---|
|  |  | S1 | S2 | S3 | S5 | S6 |
| from |  | D1 | D2 | D3 | D5 | D6 |
| Solids content | % by wt. | 22.4 | 22.6 | 22.6 | 22.3 | 22.4 |
| Viscosity*) | mPa·s | 5350 | 1530 | 6050 | 1240 | 26250 |

*)Viscosity (Brookfield) at 100 rpm and 20° C.; measured after 24 h

It was found here that the coating slip S5 according to the invention has a substantially lower viscosity than the coating slip S1. This has a direct effect on the production costs since water additionally has to be used for dilution in the case of the required low viscosities for coating slips according to the prior art and has to be evaporated again in the drying process.

Although the coating slip S2 has a low viscosity similar to that of the coating slip S5 according to the invention, a substantially higher load of the silica particles is necessary for this purpose for S2.

The coating slips S5 and S6 according to the invention are discharged onto a photographic base paper (thickness 300 µm) with the aid of a profiled doctor bar. The wet film thickness of the coating slip was 100 µm. The coating is dried at 105° C. over a period of 8 minutes. A uniform coat weight of 23 g/m² is achieved. The coated papers are printed with very high resolution on an inkjet printer of the Canon PIXMA iP6600D type. The evaluation of the printer results is reproduced in Table 5.

TABLE 5

Evaluation*) of the printer results

|  | S5 | S6 |
|---|---|---|
| Colour strength | 2 | 2 |
| Resolution | 2 | 2 |
| Colour gradient**) | 1 | 1 |

TABLE 5-continued

Evaluation*) of the printer results

|  | S5 | S6 |
|---|---|---|
| Colour shift | 1.75 | 1.5 |
| Gloss***) | 45.1 | 42.6 |

*)Best rating 1, poorest rating 6;
**)bleeding;
***)at 60° angle of view

The invention claimed is:

1. A dispersion, obtained by a method comprising reacting
a) in 50 to 75 parts by weight of water
b) 25 to 50 parts by weight of silica particles having a BET surface area of 30 to 500 m²/g and
c) an amount based on 100 to 300 µg/m²BET surface area of the silica particles from b) parts by weight of at least one aminofunctional, organosilicon compound, which is a quaternary, aminofunctional, organosilicon compound, obtained by reacting a reaction mixture comprising at least one haloalkylfunctional silane (A) with a tertiary amine (B) in the presence of water and at least partly removing a resulting hydrolysis alcohol from the reaction mixture,
wherein the amount of component c) is determined based on the amount of component b) as follows:
the amount of component b) in terms of grams is multiplied by its BET surface area to obtain a total BET surface area in terms of m², and then
the total BET surface area is multiplied by 100 to 300 µg/m²,
wherein the haloalkylfunctional alkoxysilane (A):
(i) is of formula (I)

wherein
the groups $R^1$ are identical or different and $R^1$ represents a hydrogen, a linear, branched or cyclic alkyl group having 1 to 8 C atoms, an aryl, arylalkyl, or acyl group,
the groups $R^2$ are identical or different and $R^2$ represents a linear, branched or cyclic alkyl group having 1 to 8 C atoms, an aryl, arylalkyl, or acyl group,
the groups $R^3$ are identical or different and $R^3$ represents a linear, branched or cyclic alkylene group having 1 to 18 C atoms,
n is 0 or 1,
Hal represents chlorine or bromine,
and x is 0, 1, or 2,
y is 0, 1, or 2, and
(x+y) is 0, 1, or 2; or
(ii) is a hydrolysis product or condensate of at least one alkoxysilane of formula (I); or
(iii) is a mixture of at least one alkoxysilane of formula (I) and at least one selected from the group consisting of a hydrolysis product and a condensate of at least one alkoxysilane of formula (I), and
wherein the tertiary amine (B) has a formula

wherein the groups $R^4$ are identical or different and $R^4$ represents a group $(R^1O)_{3-x-y}(R^2)_x Si[(R^3)_n CH_2—]_{1+y}$, wherein $R^1$, $R^2$, $R^3$, n, x, y and (x+y) likewise have the abovementioned meaning, or $R^4$ represents a linear, branched or cyclic alkyl group having 1 to 30 C atoms, which is optionally substituted, or optionally two groups $R^4$ in turn are linked to one another and forming a cyclic group with the nitrogen of the tertiary amine.

2. The dispersion of claim 1, wherein the at least one quaternary, aminofunctional, organosilicon compound is obtained by reacting chloropropyltriethoxysilane and tetramethylethylenediamine.

3. The dispersion of claim 1, wherein the silica particles are pyrogenically prepared silica particles.

4. The dispersion of claim 3, wherein the BET surface area of the silica particles is 200 m²/g or more.

5. The dispersion of claim 1, further comprising:
at least one selected from the group consisting of a tertiary amine and a salt of a tertiary amine.

6. The dispersion of claim 1, further comprising:
an acid.

7. A coating slip, comprising:
the dispersion of claim 1, and
at least one binder.

8. A method of manufacturing an ink-accepting inkjet medium, the method comprising:
coating the medium with the dispersion of claim 1.

9. The dispersion of claim 2, further comprising:
at least one selected from the group consisting of a tertiary amine and a salt of a tertiary amine.

10. The dispersion of claim 2, further comprising:
an acid.

11. A method of manufacturing an ink-accepting inkjet medium, the method comprising:
coating the medium with the coating slip of claim 7.

12. A dispersion, obtained by a process comprising reacting
a) in 50 to 75 parts by weight of water
b) 25 to 50 parts by weight of silica particles having a BET surface area of 30 to 500 m²/g and
c) an amount based on 100 to 300 μg/m² BET surface area of the silica particles from b) parts by weight of at least one quaternary, aminofunctional, organosilicon compound in the form of an aqueous solution, wherein the at least one quaternary, aminofunctional, organosilicon compound is at least one selected from the group consisting of
at least one condensate of at least one selected from a monomer of formula (VII) and a monomer of formula (VIII),

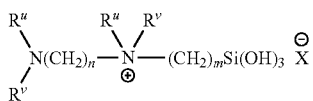
(VII)

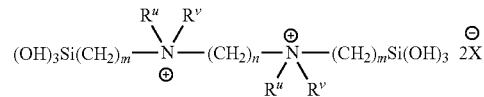
(VIII)

and a mixture of the at least one condensate and at least one selected from the group consisting of the monomer of formula (VII) and the monomer of formula (VIII),
wherein
$R^u$ and $R^v$, in each case independently of one another, are an alkyl group having 2 to 4 carbon atoms, m is 2 to 5, n is 2 to 5, and X is an anion,
wherein the amount of component c) is determined based on the amount of component b) as follows:
the amount of component b) in terms of grams is multiplied by its BET surface area to obtain a total BET surface area in terms of m², and then
the total BET surface area is multiplied by 100 to 300 μg/m².

13. The dispersion of claim 12, wherein the at least one condensate is present in an amount of 75 to 95% in the form of the formula (VII) and in an amount of 5 to 25% in the form of the formula (VIII).

14. The dispersion of claim 12, wherein a proportion of the at least one quaternary, aminofunctional, organosilicon compound in an aqueous solution is 30 to 60% by weight.

15. The dispersion of claim 13, wherein a proportion of the at least one quaternary, aminofunctional, organosilicon compound in an aqueous solution is 30 to 60% by weight.

16. The dispersion of claim 12, wherein the silica particles are pyrogenically prepared silica particles.

17. The dispersion of claim 16, wherein the BET surface area of the silica particles is 200 m²/g or more.

18. The dispersion of claim 12, further comprising:
at least one selected from the group consisting of a tertiary amine and a salt of a tertiary amine.

19. The dispersion of claim 13, further comprising:
at least one selected from the group consisting of a tertiary amine and a salt of a tertiary amine.

20. The dispersion of claim 12, further comprising:
an acid.

21. The dispersion of claim 18, further comprising:
an acid.

* * * * *